United States Patent
Zeng et al.

(10) Patent No.: US 8,711,518 B1
(45) Date of Patent: Apr. 29, 2014

(54) SYSTEM AND METHOD FOR DEPOSITION IN HIGH ASPECT RATIO MAGNETIC WRITER HEADS

(71) Applicant: Western Digital (Fremont), LLC, Fremont, CA (US)

(72) Inventors: Wanxue Zeng, Pleasanton, CA (US); Weimin Si, San Ramon, CA (US); Ying Hong, Los Gatos, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 13 days.

(21) Appl. No.: 13/628,793

(22) Filed: Sep. 27, 2012

(51) Int. Cl.
*G11B 5/127* (2006.01)

(52) U.S. Cl.
USPC .................................................. 360/125.03

(58) Field of Classification Search
USPC ........... 360/125.03, 125.12, 125.3, 125.15, 360/125.06, 125.17, 125.05, 125.31, 360/125.02, 125.1; 29/603.13, 603.16, 29/603.18
See application file for complete search history.

(56) References Cited

U.S. PATENT DOCUMENTS

| | | | | |
|---|---|---|---|---|
| 5,737,825 A | * | 4/1998 | Gray et al. | 29/603.14 |
| 5,754,377 A | * | 5/1998 | Gray et al. | 360/125.34 |
| 5,815,909 A | * | 10/1998 | Gray | 29/603.14 |
| 5,950,301 A | * | 9/1999 | Gray et al. | 29/603.12 |
| 7,244,519 B2 | | 7/2007 | Festeau et al. | |
| 7,438,949 B2 | | 10/2008 | Weidman | |
| 7,444,740 B1 | | 11/2008 | Chung et al. | |
| 7,446,032 B2 | | 11/2008 | Kailasam | |
| 7,566,661 B2 | | 7/2009 | Lavoie | |
| 7,646,568 B2 | | 1/2010 | Zhang et al. | |
| 7,651,934 B2 | | 1/2010 | Lubomirsky et al. | |
| 7,691,442 B2 | | 4/2010 | Gandikota et al. | |
| 7,773,341 B2 | | 8/2010 | Zhang et al. | |
| 7,785,658 B2 | | 8/2010 | Shinriki et al. | |
| 7,851,360 B2 | | 12/2010 | Dominguez et al. | |
| 8,084,104 B2 | | 12/2011 | Shinriki et al. | |
| 2007/0059502 A1 | | 3/2007 | Wang et al. | |
| 2007/0077750 A1 | | 4/2007 | Ma et al. | |
| 2007/0217069 A1 | * | 9/2007 | Okada et al. | 360/126 |
| 2009/0279206 A1 | | 11/2009 | Yang et al. | |
| 2011/0011744 A1 | | 1/2011 | Chen et al. | |
| 2011/0094888 A1 | | 4/2011 | Chen et al. | |
| 2013/0083429 A1 | * | 4/2013 | Macken et al. | 360/125.03 |

* cited by examiner

*Primary Examiner* — Allen T Cao

(57) ABSTRACT

Systems and methods for fabricating a microelectric device are provided herein. Various embodiments provide for systems and methods for fabricating a magnetic recording pole using plasma-enhanced chemical vapor deposition (PECVD) when depositing seed material. For some embodiments, fabrication of the magnetic recording pole may comprise using plasma-enhanced chemical vapor deposition (PECVD) Ru as an adhesion layer for a plating seed layer.

19 Claims, 6 Drawing Sheets

SYSTEM AND METHOD FOR DEPOSITION IN HIGH ASPECT RATIO MAGNETIC WRITER HEADS

BACKGROUND

During fabrication of high moment magnetic writer head, chemical vapor deposited (CVD) Ru films have commonly been used as seed layers for the electroplating of high moment magnetic writer materials, such as CoFe. So that the CVD Ru films smoothly and conformally deposit on their target substrates, a seed layer is often deposited prior to the CVD Ru deposition. At present, the CVD Ru seed used for 550 Gb/in$^2$ and 750 Gb/in$^2$ magnetic recording medium products (hereafter, referred to as "products") is either physical vapor deposited (PVD) Ta/Ru bilayers or Ta/TaO$_x$/Ru triple layers.

Unfortunately, due to line-of-sight deposition characteristics of the PVD technique, conformality of the PVD seeds is usually poor. This can be particularly problematic for certain 920 Gb/in$^2$ product that have a multiple sidewall angle structure and, as such, provide improved writeability over single sidewall writers. Due to the multiple sidewall angles and smaller track width, the aspect ratio of writer trenches resulting from a multiple sidewall angle structure is higher than other products. Accordingly, to achieve the desired writer performance, all the side gap materials which are deposited into the writer trenches should be very conformal.

BRIEF DESCRIPTION OF SEVERAL VIEWS OF THE DRAWINGS

The present invention is illustrated by way of example, and not limitation, in the figures of the accompanying drawings in which.

DETAILED DESCRIPTION OF THE PREFERRED EMBODIMENTS

Figure 1:
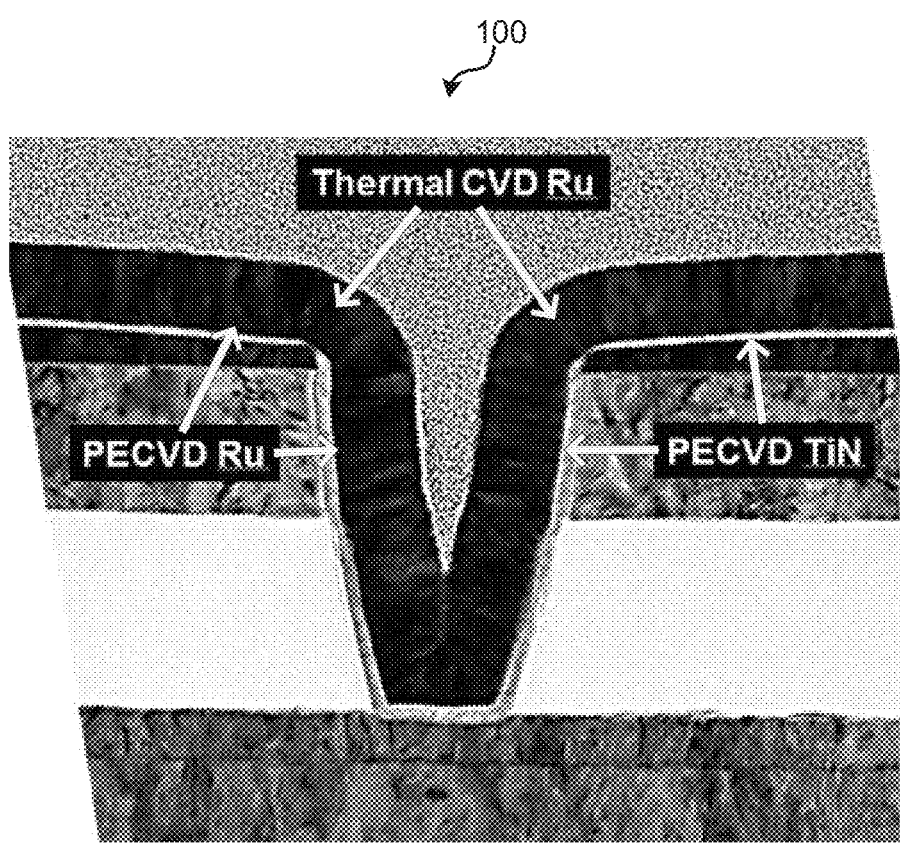
FIG. 1 is a Transmission Electron Microscope (TEM) image of a film stack in accordance with various embodiments.

In the following description, numerous specific details are set forth, such as examples of specific layer compositions and properties, to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Various embodiments provide for systems and methods for fabricating a magnetic recording pole using plasma-enhanced chemical vapor deposition (PECVD) when depositing seed material. For some embodiments, fabrication of the magnetic recording pole may comprise using plasma-enhanced chemical vapor deposition (PECVD) Ru as an adhesion layer for a plating seed layer.

For example, a method for fabricating a magnetic recording pole may involve forming an etch-protection layer, forming an adhesion layer that comprises PECVD Ru over the etch-protection layer, forming a plating seed layer over the adhesion layer, and forming a plating layer over the plating seed layer, where the plating layer comprises magnetic material and is configured to operate as the magnetic recording pole. The plating seed layer may comprise thermal chemical vapor deposition (TCVD) Ru, the plating layer may comprise CoFe, and the etch-protection layer may comprise PECVD TiN. As protection for the magnetic recording pole, a pole protection layer may be formed over the magnetic recording pole, possibly comprising physical vapor deposition (PVD) Ta.

The magnetic recording pole formed by the plating layer may comprise a pole having at least one angled sidewall. For instance, the magnetic recording pole may comprise a pole tip, a yoke distal from the pole tip, and a bottom surface including a bottom bevel, where at least the yoke includes at least one sidewall having a first angle and a second angle. The first angle may be between the bottom surface and the at least one sidewall, and the second angle may be a constant distance along the at least one sidewall from the first angle.

Use of various embodiments may prevent a side gap of non-magnetic materials from developing between the high moment writer material and side shield material in a high aspect ratio magnetic writer head. By depositing PECVD Ru (e.g., 2 nm) over a PECVD TiN layer as an adhesion layer, some embodiments may exhibit superior conformity, extremely smooth surface, good wet etch resistance, and strong adhesion of TiN/Ru/Co Fe film stacks.

Figure 2:
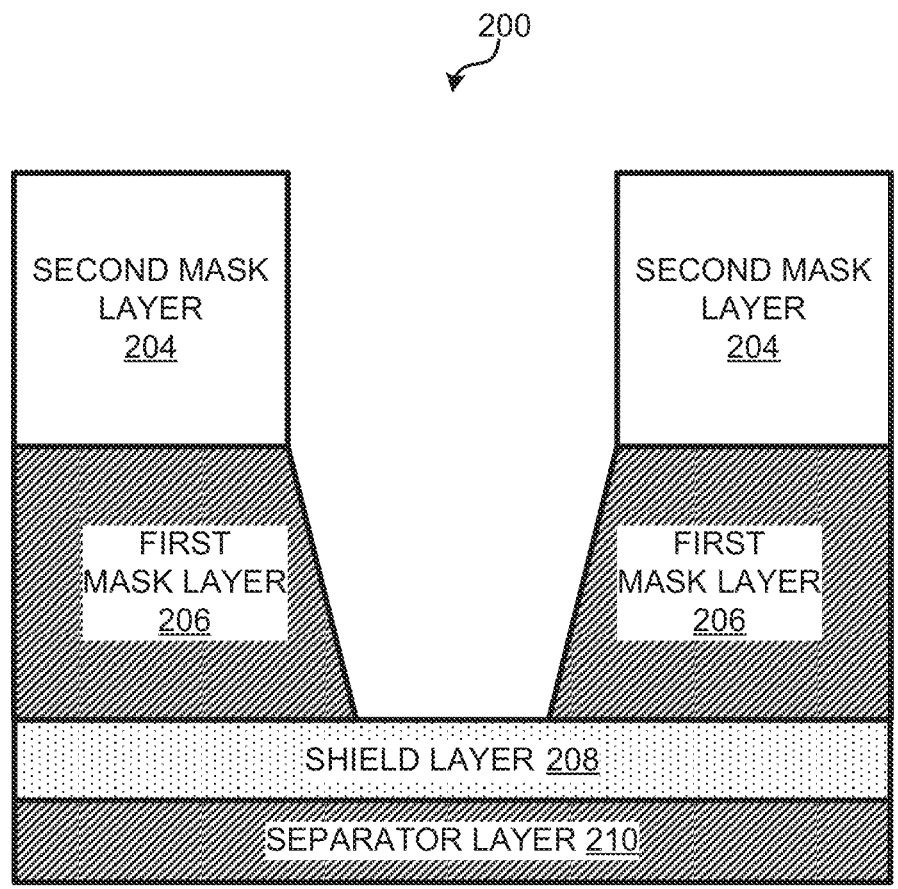
FIG. 2 depicts an exemplary multiple sidewall angle structure that may be used in fabricating magnetic recording poles in accordance with various embodiments.

FIG. 1 provides a Transmission Electron Microscope (TEM) image 100 of a TCVD Ru/PECVD/PECVD TiN film stack in accordance with some embodiments. As shown in FIG. 2, both PECVD TiN and PECVD Ru are highly conformal. According to some embodiments, the PECVD Ru films may be deposited in the same reactor as the TCVD Ru and with the same chemistries. In particular embodiments, the root-mean squared (RMS) surface roughness of 40 nm CVD Ru deposited on 2 nm PECVD Ru/10 nm PECVD TiN may be approximately 0.5 nm, which may be half or quarter as much as previous film stacks.

For some embodiments, the adhesion properties for a PECVD TiN/PECVD Ru/TCVD Ru film stack may be the result of the PECVD Ru process. During the PECVD Ru process, a direct current (DC) bias is formed above wafer surface during a plasma step, and Ar ions are generated in the plasma. The Ar ions achieve energy when traveling through the electric field (sheath) and bombard onto the wafer surface with significant kinetic energy. In this way, the PECVD Ru process may increase interface roughness and interface area as a result of the bombardment, both of which can be beneficial to adhesion. Additionally, H ions and radicals generated in the plasma are highly reactive, which can reduce the $TiO_x$ formed by $RuO_4$ and/or air (shown below as reactions 1 and 2). The reduction of $TiO_x$ to Ti can increase adhesion between Ru and TiN than the $TiO_x$ does (reaction 3). The PECVD Ru films may comprise lower amount of impurities (e.g., H, O, F, and C) that would otherwise detract from the adhesion between Ru and TiN.

$$TiN + RuO_4 \rightarrow TiO_x + RuO_y + N_2 \quad \text{Reaction 1}$$

$$TiN + O_2 \text{ (in air)} \rightarrow TiO_x + N_2 \quad \text{Reaction 2}$$

$$TiO_x + H \rightarrow Ti + H_2O \quad \text{Reaction 3}$$

The smoother surface of PECVD Ru that results from some embodiments can provide for better track width control and higher yield for high aspect ratio magnetic writer heads. Additionally, because PECVD TiN, PECVD Ru, and TCVD Ru can be processed on the same tool set in accordance with some embodiments, certain operations can be eliminated and hours on wafer processing can be reduced.

FIG. 2 depicts an exemplary multiple sidewall angle structure 200 that may be used in fabricating magnetic recording poles in accordance with various embodiments. According to some embodiments, the multiple sidewall angle structure 200 may comprise a dual sidewall angle trench utilized in the formation of a magnetic recording pole. As shown, the structure 200 may comprise a separator layer 210, a shield layer 208 disposed over the separator layer 210, a first mask layer 206 disposed over the shield layer 208, and a second mask layer 204 disposed over the first mask layer 206.

For some embodiments, the separator layer 210 may comprise $Al_2O_3$ and be formed to separate the structure 200 from other layers of a magnetic recording head disposed under the structure 200. The shield layer 208 may comprise Ni or NiFe and be formed to function as an etch-stop during fabrication of a magnetic recording pole in accordance with some embodiments. Additionally, both the first mask layer 206 and the second mask layer 204 may be formed such that they shape the magnetic recording pole as the pole is fabricated in accordance with some embodiments. In some embodiments, the first mask layer 206 may comprise $AlO_x$, while the second mask layer 204 may comprise Cr (e.g., PVD Cr). During fabrication of the magnetic recording pole, both the first mask layer 206 and the second mask layer 204 may be removed by way of an etch process (e.g., wet etch process).

Figure 3:
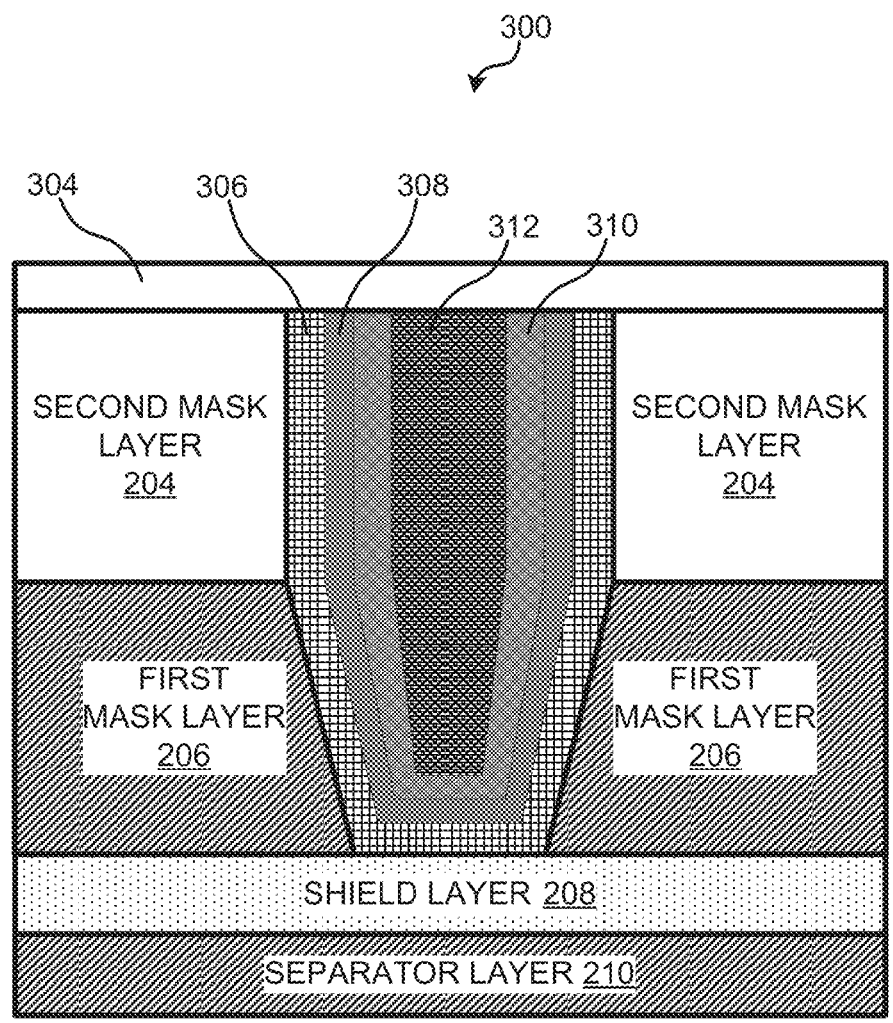
FIG. 3 is an exemplary structure that results during fabrication of a magnetic recording pole in accordance with various embodiments.

FIG. 3 is an exemplary structure 300 that results during fabrication of a magnetic recording pole in accordance with various embodiments. As shown in FIG. 3, for some embodiments, the structure 200 of FIG. 2 may utilized in the structure 300 during fabrication of a magnetic recording pole, whereby the trench formed by the first mask layer 206 and the second mask layer 204 form the magnetic recording pole. The magnetic recording pole formed within the trench of the structure 200 may comprise an etch-protection layer 306, an adhesion layer 308 disposed over the etch-protection layer 306 and comprising plasma-enhanced chemical vapor deposition (PECVD) Ru, a plating seed layer 310 disposed over the adhesion layer 308, and a plating layer 312 disposed over the plating seed layer 310. A pole protection layer 304 may be formed over a top surface of the magnetic recording pole formed in the trench of the structure 200.

In accordance with some embodiments, the etch-protection layer 306 may comprise a plasma-enhanced atomic layer deposition (TiN) (e.g., 2 nm in thickness) and the plating seed layer 310, which assists in the formation of the plating layer 312, may comprise thermal chemical vapor deposition (TCVD) Ru. The plating layer 312 may comprise CoFe, and the pole protection layer 304 may comprise physical vapor deposition (PVD) Ta.

Figure 4:
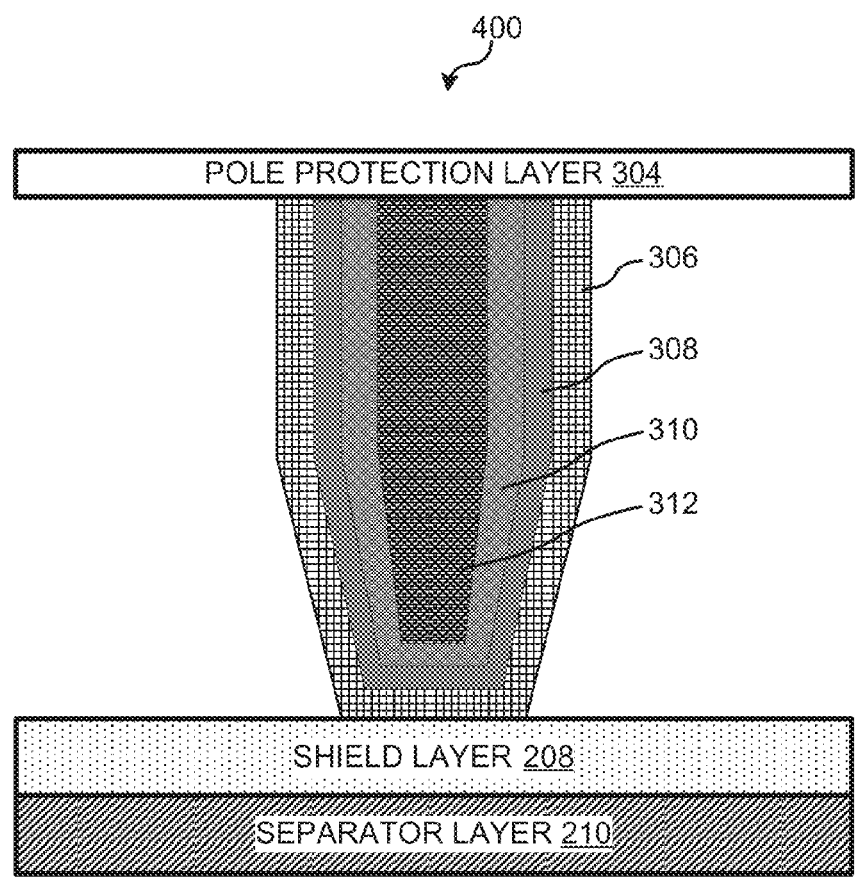
FIG. 4 is an exemplary magnetic writer pole fabricated in accordance with various embodiments.

FIG. 4 depicts an exemplary magnetic recording pole 400 that may result from the structure 300 of FIG. 3 once the first mask layer 206 and the second make layer 204 have been removed from the structure 300 (e.g., by a wet etch process).

Figure 5:
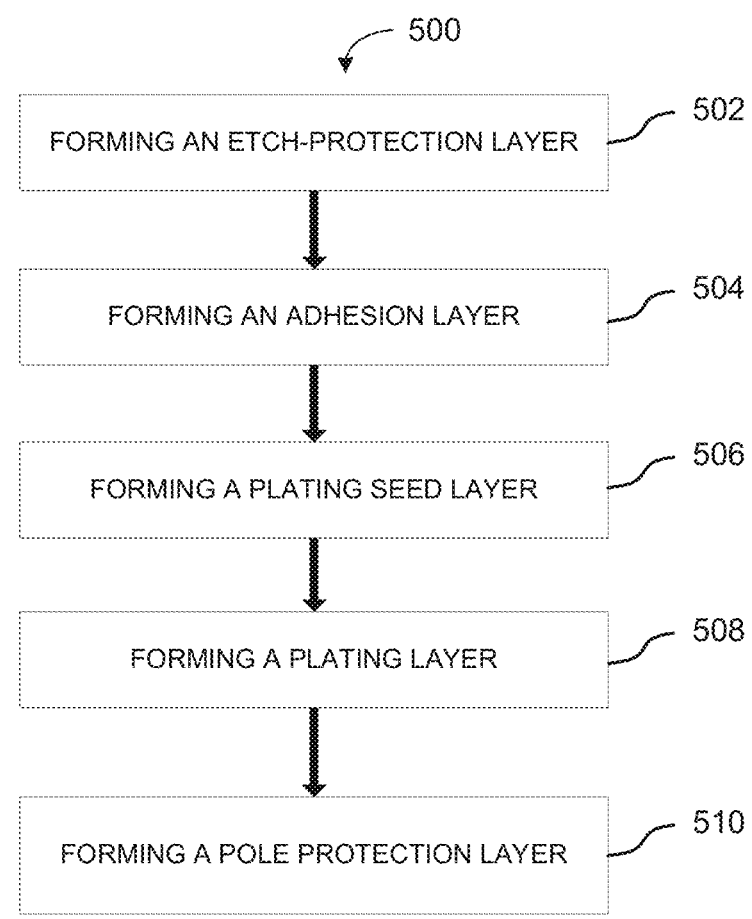
FIG. 5 is a flowchart illustrating an exemplary method in accordance with various embodiments.

FIG. 5 is a flowchart 500 illustrating an exemplary method for fabricating a magnetic recording pole in accordance with various embodiments. According to some embodiments, the method illustrated by the flowchart 500 may be employed in the fabrication of the magnetic recording pole 400 depicted in FIG. 4. Additionally, for some embodiments, the structure 200 depicted in FIG. 2 may be utilized by the method during fabrication, whereby the magnetic recording pole is formed within the trench of the structure 200.

As shown, the method may being at operation 502 with the formation of an etch-protection layer (e.g., 306), and is followed by the formation of an adhesion layer (e.g., 308) over the etch protection layer at operation 504. At operation 506, a plating seed layer (e.g., 310) is formed over the adhesion layer, thereby adhering the plating seed layer to the etch-protection layer. In accordance with various embodiments, the adhesion layer may comprise PECVD Ru, which provides for enhanced adhesion with the etch-protection layer and the plate seed layer. The method eventually continues to operation 508, where a plating layer (e.g., 312) is formed over the plating seed layer. To protect the magnetic writer pole from damage, a pole protection layer may subsequently be formed over the magnetic recording pole structure (e.g., 302) at operation 510.

Figure 6:
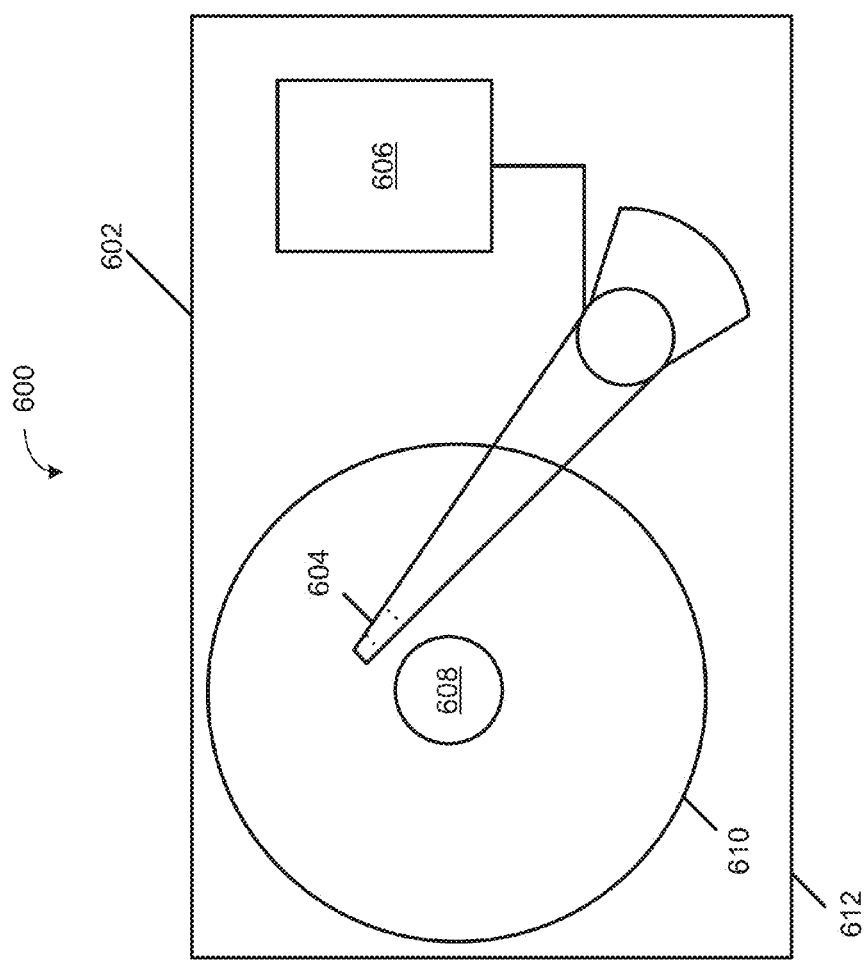
FIG. 6 is a diagram illustrating an exemplary disk drive including a magnetic recording head formed in accordance with some embodiments.

FIG. 6 is a diagram illustrating an exemplary disk drive 600 including a read-write the head 604 that can be created in accordance with some embodiments. Disk drive 600 may include one or more disks to store data. The disks 610 reside on a spindle assembly 608 that is mounted to drive housing 612. Data may be stored along tracks in the magnetic recording layer of one of the disks 610. The reading and writing of data is accomplished with the head 604 that has both read and write elements. The write element is used to alter the properties of the perpendicular magnetic recording layer of disk 610. In some embodiments, the head 604 may comprising a magnetic recording pole fabricated according to an embodiment described herein. In various embodiments, the disk drive 600 may comprise magnetic recording pole, and the head 604 may be suitable for perpendicular magnetic recording (PMR). A spindle motor (not shown) rotates the spindle assembly 608 and, thereby, disks 610 to position the head 604 at a particular location along a desired disk track. The position of the head 604 relative to the disks 610 may be controlled by position control circuitry 606.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A method for fabricating a magnetic recording pole, comprising:

forming an etch-protection layer;

forming an adhesion layer over the etch-protection layer, wherein the adhesion layer comprises plasma-enhanced chemical vapor deposition (PECVD) Ru;

forming a plating seed layer over the adhesion layer; and forming a plating layer over the plating seed layer, wherein the plating layer comprises magnetic material and is configured to operate as the magnetic recording pole.

2. The method of claim 1, wherein the plating seed layer comprises thermal chemical vapor deposition (TCVD) Ru.

3. The method of claim 1, wherein the plating layer comprises CoFe.

4. The method of claim 1, wherein the etch-protection layer comprises a plasma-enhanced chemical vapor deposition (PECVD) TiN.

5. The method of claim 1, further comprising forming a pole protection layer over the magnetic recording pole.

6. The method of claim 5, wherein the pole protection layer comprises physical vapor deposition (PVD) Ta.

7. The method of claim 1, wherein the adhesion layer is formed from $RuO_4$ precursor.

8. The method of claim 1, wherein the plating layer is formed such that the magnetic recording pole comprises a pole having at least one angled sidewall.

9. The method of claim 1, wherein the magnetic recording pole comprises a pole tip, a yoke distal from the pole tip, and a bottom surface including a bottom bevel, wherein at least the yoke includes at least one sidewall having a first angle and a second angle, the first angle is between the bottom surface and the at least one sidewall, and the second angle is a constant distance along the at least one sidewall from the first angle.

10. A magnetic recording pole, comprising:

an etch-protection layer;

an adhesion layer disposed over the etch-protection layer, wherein the adhesion layer comprises plasma-enhanced chemical vapor deposition (PECVD) Ru;

a plating seed layer disposed over the adhesion layer; and a plating layer disposed over the plating seed layer, wherein the plating layer comprises magnetic material and is configured to operate as the magnetic recording pole.

11. The magnetic recording pole of claim 10, wherein the plating seed layer comprises thermal chemical vapor deposition (TCVD) Ru.

12. The magnetic recording pole of claim 10, wherein the plating layer comprises CoFe.

13. The magnetic recording pole of claim 10, wherein the etch-protection layer comprises plasma-enhanced chemical vapor deposition (PECVD) TiN.

14. The magnetic recording pole of claim 10, further comprising a pole protection layer over the magnetic recording pole.

15. The magnetic recording pole of claim 14, wherein the pole protection layer comprises physical vapor deposition (PVD) Ta.

16. The magnetic recording pole of claim 10, wherein the adhesion layer is formed from $RuO_4$ precursor.

17. The magnetic recording pole of claim 10, wherein the plating layer is formed such that the magnetic recording pole comprises a pole having at least one angled sidewall.

18. The magnetic recording pole of claim 10, wherein the magnetic recording pole comprises a pole tip, a yoke distal from the pole tip, and a bottom surface including a bottom bevel, wherein at least the yoke includes at least one sidewall having a first angle and a second angle, the first angle is between the bottom surface and the at least one sidewall, and the second angle is a constant distance along the at least one sidewall from the first angle.

19. A disk drive, comprising:

a media;

a slider; and a magnetic recorder pole coupled to the slider, the magnetic recorder pole comprising: an etch-protection layer, an adhesion layer disposed over the etch-protection layer, wherein the adhesion layer comprises plasma-enhanced chemical vapor deposition (PECVD) Ru, a plating seed layer disposed over the adhesion layer, and a plating layer disposed over the plating seed layer, wherein the plating layer comprises magnetic material and is configured to operate as the magnetic recording pole.

* * * * *